United States Patent
Kotoneva

(10) Patent No.: US 10,087,394 B2
(45) Date of Patent: Oct. 2, 2018

(54) METHOD AND SYSTEM FOR REDUCING RESIDUAL SOAP IN CRUDE TALL OIL

(71) Applicant: UPM-KYMMENE CORPORATION, Helsinki (FI)

(72) Inventor: Jari Kotoneva, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 15/202,715

(22) Filed: Jul. 6, 2016

(65) Prior Publication Data

US 2017/0009181 A1 Jan. 12, 2017

(30) Foreign Application Priority Data

Jul. 8, 2015 (FI) .................................. 20155539

(51) Int. Cl.
*C11B 3/04* (2006.01)
*C11B 13/00* (2006.01)
*D21C 11/00* (2006.01)

(52) U.S. Cl.
CPC ............. *C11B 3/04* (2013.01); *C11B 13/005* (2013.01); *D21C 11/0007* (2013.01); *Y02W 30/74* (2015.05)

(58) Field of Classification Search
CPC ...... C11B 3/04; C11B 13/005; D21C 11/0007
See application file for complete search history.

(56) References Cited

U.S. PATENT DOCUMENTS

| | | | |
|---|---|---|---|
| 4,075,188 A | 2/1978 | Vardell, Jr. | |
| 4,208,282 A * | 6/1980 | Becker | A23J 1/001 210/705 |
| 5,262,963 A * | 11/1993 | Stana | B01J 19/0033 700/266 |
| 5,283,319 A | 2/1994 | Huibers et al. | |
| 6,348,566 B1 * | 2/2002 | Sarasto | C11B 13/02 530/205 |
| 7,208,570 B2 * | 4/2007 | Saviainen | C10G 7/12 196/132 |
| 2009/0227767 A1 * | 9/2009 | Sellerholm | C11B 13/005 530/209 |

(Continued)

FOREIGN PATENT DOCUMENTS

| | | |
|---|---|---|
| CA | 2133663 C | 7/2006 |
| EP | 1637582 A1 | 3/2006 |

(Continued)

OTHER PUBLICATIONS

Kanicky, J. R., and D. O. Shah. "Effect of premicellar aggregation on the p K a of fatty acid soap solutions." Langmuir 19.6 (2003): 2034-2038.*

(Continued)

*Primary Examiner* — Nicholas E Hill
(74) *Attorney, Agent, or Firm* — Cantor Colburn LLP

(57) ABSTRACT

The present invention relates to a method and system for reducing residual soap in crude tall oil, wherein crude tall oil is supplied via piping to at least one vessel, soap number of the crude tall oil is determined using on-line measuring technique and sulphuric acid is added to the crude tall oil at a site of blending, where the dosing of the sulphuric acid is adjusted on-line to provide soap number of not more than 2.

22 Claims, 1 Drawing Sheet

(56) References Cited

U.S. PATENT DOCUMENTS

| | | | |
|---|---|---|---|
| 2011/0213169 A1* | 9/2011 | Ristolainen | C11B 3/008 |
| | | | 554/8 |
| 2015/0166931 A1* | 6/2015 | Bowles | C11B 13/005 |
| | | | 530/208 |
| 2017/0088794 A1* | 3/2017 | Finer | C11B 13/005 |

FOREIGN PATENT DOCUMENTS

| | | | | |
|---|---|---|---|---|
| WO | WO 2004074415 A1 * | 9/2004 | | C11B 13/005 |
| WO | 2009131510 | 10/2009 | | |
| WO | WO 2010136079 A1 * | 12/2010 | | C11B 13/005 |
| WO | 2013173077 A2 | 11/2013 | | |
| WO | 2014098692 A1 | 6/2014 | | |
| WO | 2015055896 A1 | 4/2015 | | |

OTHER PUBLICATIONS

Anthonykutty, et al., "Catalytic Upgrading of Crude Tall Oil Into a Paraffin-Rich Liquid" Biomass Conv. Bioref. (2015) vol. 5, pp. 149-159.
Wansbrough, H. Tall Oil Production and Processing, http://nzic.org.nz/ChemProcesses/forestry/4G.pdf, retrieved Jan. 27, 2017, 11 Pages.
McSweeney, E.E. et al., "Composition of Crude Tall Oil & Fractionation Products", Tall Oil and Its Uses—II, 1987, pp. 12-19.

* cited by examiner

METHOD AND SYSTEM FOR REDUCING RESIDUAL SOAP IN CRUDE TALL OIL

CROSS-REFERENCE TO RELATED APPLICATION

This application claims priority to Finnish Application No. 20155539 filed on Jul. 8, 2015, which is incorporated by reference herein in its entirety.

FIELD OF THE INVENTION

The present invention relates to a method for reducing residual soap in crude tall oil. More particularly the invention relates to a method, where crude tall oil is treated with sulphuric acid.

BACKGROUND OF THE INVENTION

Tall oil materials are used as starting materials in the chemical industry, for example in paints, coatings, adhesives, printing inks, paper chemicals and in the manufacture of hydrocarbons, suitable as liquid fuels, as transportation fuels, or compatible with transportation fuels. Biofuels are typically manufactured from starting materials originating from renewable sources including tall oil materials, such as crude tall oil. The starting material can be hydroprocessed in one or more steps to yield hydrocarbons.

Tall oil materials, such as crude tall oil, are mixtures of a wide range of various compounds. Crude tall oil is obtained as a by-product from the pulp and paper industry. In the pulping process "black liquor" obtained from pulp cooking is concentrated and allowed to settle. The top layer known as "tall oil soap" is then skimmed off. Tall oil soap is reacted with an acid, and typically this acidulation is carried out with sulphuric acid, whereby crude tall oil is formed and sulphur containing gases, such as hydrogen sulphide, methylmercaptan, dimethyl sulphide and dimethyldisulphide are released. The acidulation step in the pulp mill is often inaccurate, whereby varying amounts of tall oil soap remain in the crude tall oil because of incomplete acidulation. Problems relating to corrosion due to the acidic conditions and increased odorous gas emissions, as well as of the aim to reduce costs and load of sulphate salts are often reasons why pulp mills tend to use as little as possible of sulphuric acid.

Crude tall oil (CTO) is renewable material, which comprises a mixture of plant derived compounds obtained as a by-product from processes of the forest industry, typically from processing of pine and/or spruce trees. CTO is mainly composed of both saturated and unsaturated oxygen-containing organic compounds, such as unsaponifiable matter, neutral substances including sterols and esters, resin acids (mainly abietic acid and its isomers), fatty acids (mainly palmitic acid, linoleic acid, oleic acid and linolenic acid), fatty alcohols, sterols and other alkyl hydrocarbon derivatives. Typically, CTO contains varying amounts of impurities, such as inorganic sulphur compounds, metals, Na, K, Ca and phosphorus, tall oil soap and water. The composition of CTO and the amounts of impurities therein vary depending on the specific wood species and on the process yielding CTO.

The impurities in CTO refer here particularly to metallic impurities, impurities comprising Na, K, Ca, P, tall oil soap and water, and combinations thereof.

Wood type has obvious effect on the quality and composition of the produced crude tall oil, and different proportions of resin acids, fatty acids and unsaponifiables are produced from different wood species.

Tall oil soap contains accumulated metallic impurities and impurities comprising any of Na, K, Ca and P, which act as catalyst inhibitors and poisons in possible subsequent catalytic processing. Tall oil soap contains also some water. Crude tall oil used as starting material in hydroprocessing should contain as little as possible of these impurities.

Crude tall oil may be purified by means of washing with washing liquid, filtering, distillation, degumming, depitching and evaporating. Typically, purification by depitching is used where nonvolatile materials are removed, or alternatively distillation. However, simultaneously part of valuable starting material is lost. Further, crude tall oil is sensitive to heat, which may cause degradation and subsequent loss of product.

U.S. 2011213169 A1 discloses a method and apparatus for purifying CTO, where metals and other impurities are removed from CTO by precipitation with acidification.

WO 2009131510 A1 describes a method for converting CTO to diesel fuel, said method comprising the step where residual soap and impurities are removed from CTO by washing with sulphuric acid.

WO 2013173077 A2 relates to a semi-continuous acidulation of CTO soap, where CTO soap is combined with sulphuric acid and water.

WO 2015055896 A1 discloses pretreatment of CTO for removing impurities, where the pretreatment comprises at least two evaporative steps.

WO 2014098692 A1 relates to removal of impurities from CTO by washing with water containing chelating agent.

CA 2133663 C describes reduction of residual soap in CTO by using strong acids.

Despite the ongoing research and development of processes utilizing crude tall oil as feedstock, there is still a need to provide an improved method for reducing impurities, particularly residual soap in crude tall oil.

SUMMARY OF THE INVENTION

An object of the invention is to provide an improved method and system for reducing residual soap in crude tall oil.

Another object of the invention is to provide simple, efficient and economic method and system for reducing residual tall oil soap, metal impurities and water in crude tall oil, while maintaining valuable components in the treated crude tall oil.

Still another object of the invention is to provide simple, efficient and economic method and system for reducing residual soap in crude tall oil and to yield treated crude tall oil suitable as feedstock for hydroprocessing.

The present invention generally concerns a method for reducing residual soap in crude tall oil.

Further, the present invention generally concerns a system for reducing residual soap in crude tall oil.

The invention relates to a method for reducing residual soap in crude tall oil, wherein the method comprises the steps, where crude tall oil is supplied to at least one vessel,
soap number of the crude tall oil is measured on-line,
an amount of sulphuric acid, having concentration between 20-50 wt % and needed for adjusting the soap number to a value not more than 2, is determined, and the determined amount of sulphuric acid is added to the crude tall oil at a site of blending, whereby treated crude tall oil having soap number not more than 2 is obtained.

The invention also relates to a system for reducing residual soap of crude tall oil, wherein the system comprises
a line 500 connected to at least one crude tall oil storage vessel 200 and supplying crude tall oil to the vessel,
an on-line measuring device 300 connected to line 900 and determining the soap number of the crude tall oil running in the line 900,
a dosing device 400 connected to the line 900 or 600 at a site of blending of crude tall oil and sulphuric acid, arranged upstream the vessel 200,
a control unit 800 receiving determined soap number from the measuring device 300 and determining as an output the amount of sulphuric acid, having concentration between 20-50 wt %, needed for adjusting the soap number of the crude tall oil to a value of not more than 2, and transmitting the output of the amount of sulphuric acid to a sulphuric acid dosing device 400.

Characteristic features of the invention are presented in the appended claims.

DEFINITIONS

The expression "reducing residual soap" refers here reducing the content of residual tall oil soap in crude tall oil. The acidulation step in the pulp mill is often inaccurate, whereby varying amounts of tall oil soap remain in the crude tall oil because of incomplete acidulation.

The expression "adjusting of soap number" refers here to controlling the soap number to a desired level or range. The adjusting of soap number of crude tall oil is carried out by adding sulphuric acid to the crude tall oil.

The term "hydroprocessing" refers here to catalytic processing of feedstock originating from renewable sources by all means of molecular hydrogen.

Transportation fuels refer to fractions or cuts or blends of hydrocarbons having distillation curves standardized for fuels, such as for diesel fuel (middle distillate from 160 to 380° C., EN 590), gasoline (40-210° C., EN 228), aviation fuel (160 to 300° C., ASTM D-1655 jet fuel), kerosene, naphtha, etc.

Liquid fuels are hydrocarbons having distillation curves standardized for fuels.

DETAILED DESCRIPTION OF THE INVENTION

It was surprisingly found that the content of impurities in crude tall oil can be reduced to a low level by using an efficient and economic method, where residual soap is reduced in the crude tall oil, and particularly the content of metal impurities, tall oil soap and water is reduced in the crude tall oil. This is accomplished by acidulating the tall oil soap in the crude tall oil running in the piping, before it is led to storage vessels. The amount of sulfuric acid to be added to the crude tall oil is determined by measuring on-line the soap number of the crude tall oil. The soap number suitable for the crude tall oil to be led to the storage is the target soap number, which is not more than 2.

By acidulating the tall oil soap in the crude tall oil, the metallic impurities, impurities comprising any of Na, K, Ca and P and water in the soap are released from the crude tall oil and they separated from the storage tank with other impurities. Thus the amount of the impurities of the treated crude tall oil is smaller than that in the crude tall oil before acidulation.

The invention relates to a method for reducing residual soap in crude tall oil, wherein the method comprises the steps, where
crude tall is supplied to at least one vessel,
soap number of the crude tall oil is measured on-line,
an amount of sulphuric acid having concentration between 20-50 wt %, needed for adjusting the soap number to a value of not more than 2 is determined, and
the determined amount of sulphuric acid is added to the crude tall oil at a site of blending whereby treated crude tall oil having soap number not more than 2 is obtained.

In an embodiment the method further comprises the steps where
the measured soap number is transmitted as an input to a controlling unit, which controlling unit determines as an output the amount of sulphuric acid needed for adjusting the soap number to a value of not more than 2,
the output of the amount of sulphuric acid is transmitted to a sulphuric acid dosing device, and
the amount of sulphuric acid is added to the crude tall oil according to the output, at a site of blending prior at a site of blending of the crude tall oil and sulphuric acid.

The soap number value of not more than 2 means here the target soap number.

Treated CTO refers here to CTO, which has been subjected to treating with sulphuric acid to adjust the soap number to the target soap number by the method disclosed above. Thus the soap number is adjusted to the tare.

In the method the crude tall oil is supplied via a line to at least one vessel using an unloading pump.

Figure 1:
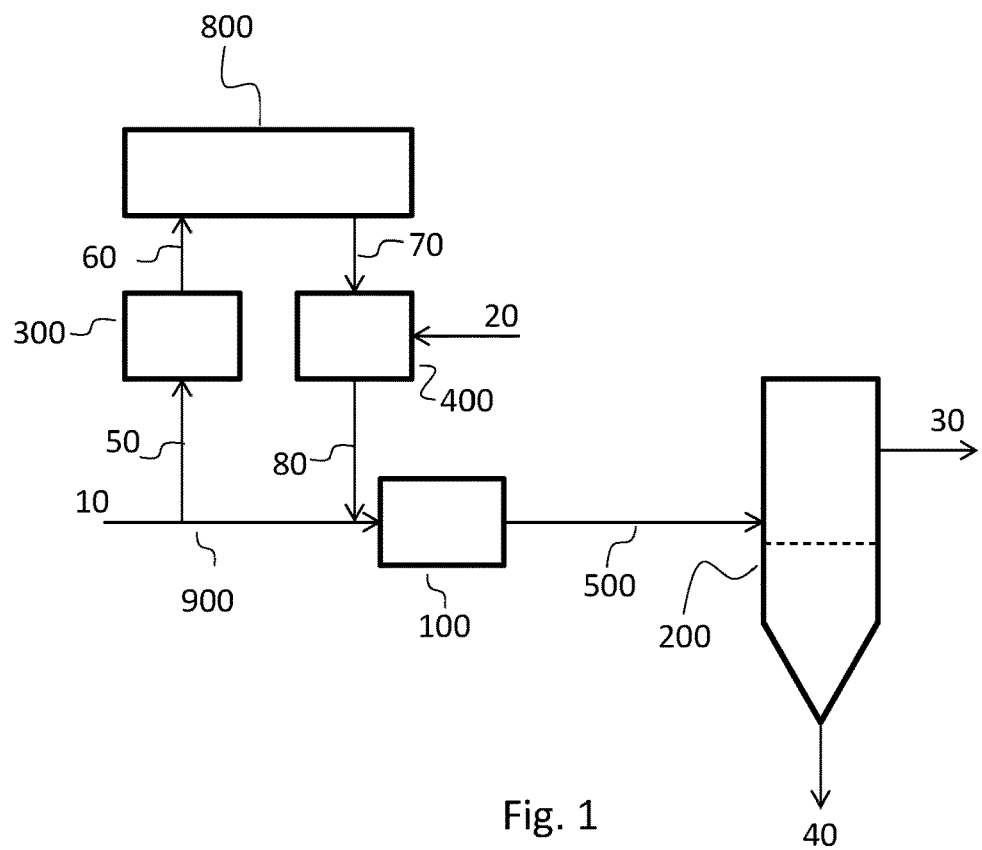
FIG. 1 illustrates one embodiment of the method, where sulphuric acid is dosed to the suction side of an unloading pump.

FIG. 1 presents an embodiment of the method, where crude tall oil 10 is supplied via line 900 to an unloading pump 100, and by the unloading pump 100 to storage vessel 200. On-line measuring of the soap number of crude tall oil sample stream 50 is carried out by FT-NIR device 300, which provides soap number measuring data as input 60 to a controlling unit 800. The controlling unit 800 determines as an output 70 the amount of sulphuric acid, having concentration between 20-50 wt %, needed for adjusting the soap number to a value of not more than 2, and the output 70 of the amount of sulphuric acid is transmitted to a sulphuric acid dosing device 400. The dosing device doses sulphuric acid 20 as stream 80, needed for adjusting the soap number to a value of not more than 2, to the suction side of the unloading pump 100, where sulphuric acid is mixed with crude tall oil and the obtained mixture is pumped via line 500 to storage vessel 200 and it is allowed to settle. After settling treated crude tall oil 30 having soap number of not more than 2 is decanted from the vessel 200, and aqueous phase 40 is drained.

Figure 2:
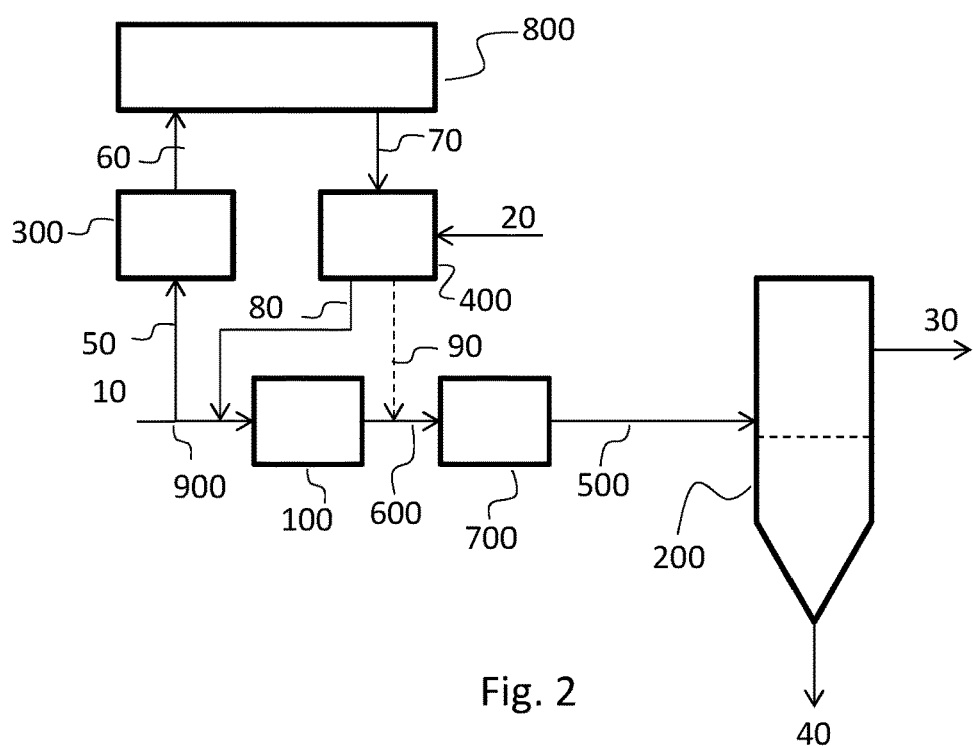
FIG. 2 illustrates another embodiment where sulphuric acid is dosed to the suction side of an unloading pump and mixed in a pipeline mixer with crude tall oil.

FIG. 2 presents another embodiment of the method, where crude tall oil 10 is supplied via line 900 to an unloading pump 100, and by the unloading pump 100 to storage vessel 200. On-line measuring of soap number of crude tall oil sample stream 50 is carried out by FT-NIR device 300, which provides soap number measuring data as input 60 to a controlling unit 800. The controlling unit 800 determines as an output 70 the amount of sulphuric acid, having concentration between 20-50 wt %, needed for adjusting the soap number to a value of not more than 2, and the output 70 of the amount of sulphuric acid is transmitted to sulphuric acid dosing device (400). The dosing device doses sulphuric acid 20 as stream 80, needed for adjusting the soap number to a value of not more than 2, to the suction side of the unloading pump 100, or alternatively as stream 90 (shown with dotted line in the figure) to line 600 between the unloading pump 100 and the pipeline mixer 700, where sulphuric acid is mixed with crude tall oil and the obtained mixture is pumped via line 500 to storage vessel 200 and it is allowed to settle. After settling treated crude tall oil 30 having soap number of not more than 2 is decanted from the vessel 200, and aqueous phase 40 is drained.

The invention relates to a system for reducing residual soap of crude tall oil, wherein the system comprises
- a line 500 connected to at least one crude tall oil storage vessel 200 and supplying crude tall oil to the vessel,
- an on-line measuring device 300 connected to line 900 and determining the soap number of the crude tall oil running in the line 900,
- a dosing device 400 connected to the line 900 or 600 at a site of blending of crude tall oil and sulphuric acid, arranged upstream the vessel 200,
- a control unit 800 receiving determined soap number from the measuring device 300 and determining as an output the amount of sulphuric acid, having concentration between 20-50 wt %, needed for adjusting the soap number of the crude tall oil to a value of not more than 2, and transmitting the output of the amount of sulphuric acid to a sulphuric acid dosing device 400.

In an embodiment the crude tall oil is supplied first via line 900 to an unloading pump 100. In another embodiment a pipeline mixer 700 is arranged downstream the unloading pump 100.

In an embodiment the system comprises an unloading pump 100 connected to the line 900 supplying the CTO to the unloading pump 100 (blending site), which further supplies the mixture of sulphuric acid and CTO to the vessel 200. Alternatively, the unloading pump 100 supplies the CTO via line 600, where sulphuric acid, together with sulphuric acid to the pipeline mixer (blending site), where the blending takes place, and there from via line 500 to the vessel 200.

Thus the blending site may be the unloading pump in the case sulphuric acid is added to the suction side of the unloading pump, or the pipeline mixer in the case sulphuric acid is added after the unloading pump but prior to the pipeline mixer.

In an embodiment the on-line measuring device 300 is a FT-NIR device.

In an embodiment the length of the line (line 500) between the site of blending and the vessel is at least 20 m.

In an embodiment the vessel (vessel 200) comprises means for separating and recovering the treated crude tall oil.

In an embodiment the unloading pump is connected, for example via a pipe (line 900 etc.), to a pulping plant, tanker truck or tanker ship, which are not shown in the figures.

The control unit adjusts the amounts of sulphuric acid needed, based mathematical models, and it provides and transmits to the dosing device signals for accomplishing the dosing, based on signals received from the on-line measuring device.

The site where sulphuric acid is added to (or blended with) CTO refers here to the site of blending.

The aqueous phase may also contain some solid materials, such as precipitates, salts etc.

The target soap number, i.e. the value where the soap number is adjusted to is not more than 2, suitably not more than 1, even more suitably not more than 0.5, and particularly suitably not more than 0.2.

In the case where the soap number of CTO, which is supplied to a vessel, is already below the target (i.e. not more than 2), no addition of sulphuric acid is necessary and there is no need for removing impurities, in this case said CTO is supplied or transferred to the vessel as such.

In the method the temperature of the supplied crude tall oil is maintained at 30-100° C., suitably 30-85° C., even more suitably 50-80° C., particularly suitably at 70-80° C. The supplied CTO means here CTO which is supplied or transferred to a line such as piping etc.

The soap number is measured or determined from the crude tall oil prior to mixing of sulphuric acid therein, i.e. prior to or upstream to the connection of sulphuric acid feeding line.

Suitably sulphuric acid is added to the CTO in the vicinity of the unloading pump, suitably to the suction side of the unloading pump. Alternatively sulphuric acid may be added to a line between the unloading pump and a pipeline mixer.

Adding or dosing of sulphuric acid is carried out suitably using a dosing device.

In a suitable embodiment the line comprises a pipeline mixer downstream the unloading pump. The pipeline mixer arranged after or downstream the unloading pump is used for providing efficient mixing.

Crude tall oil is suitably transferred or supplied by pumping from a pulping plant, tanker truck or tanker ship. Crude tall oil may for example be unloaded from tanker trucks at a site or plant where it is intended to be used as feedstock in a process, such as hydroprocessing process.

The pumping is carried our using an unloading pump. The unloading pump is connected to piping, which is connected to at least one vessel. Any suitable pump for pumping of CTO may be used, such as centrifugal pumps, vane pumps, and the like.

Line refers here to a transferring or transporting line, such as pipe or piping or pipeline suitable for transferring crude tall oil.

The line has a length between the site of blending of crude tall oil and sulphuric acid, and the vessel of at least 20 m. The site of blending crude tall oil and sulphuric acid may refer to the unloading pump or pipeline mixer. For providing adequate mixing prior to entering the vessel, the length of the line between the site of blending crude tall oil and sulphuric acid and the vessel shall be sufficiently long, at least 20 m.

The diameter of the line, such as pipe is suitably between 10 and 30 cm.

The vessel is a reservoir selected from storage vessels, storage containers and storage tanks. The transfer of CTO may be carried to one vessel or to several vessels.

The vessels, pumps and lines are suitably manufactured from acid resistant or acid tolerant materials generally known in the field.

Soap number reflects the amount of saponified acids (acid number reflects the amount of free acids) in the crude tall oil. Soap number may conventionally be determined by titration or it may for example be determined or measured on-line by spectroscopic methods, such as Fourier-transformation near infrared (FT-NIR) methods.

The on-line measuring methods for the determination of the soap number of crude tall oil refer here to direct on-line analysis methods, which are able to provide continuously in real time the soap number of the crude tall oil with sufficient measurement and reading accuracy. Generally the soap number is given by mass. Suitably the on-line measuring of the soap number is carried out by a FT-NIR method. Suitable devices for this purpose are commercially available FT-NIR devices, which make it possible to determine the soap number of crude tall oil in a few seconds, with the same accuracy as with conventional titration methods used in laboratories, said accuracy being approximately 0.2%. In the measurement, a radiation in wavelength area of the near infrared spectrum is transmitted to the crude tall oil running in the piping and the reflected/penetrated radiation is measured. A mathematical Fourier transform process is used to convert the raw measurement data to a spectrum, which is analysed to give the soap number of the crude tall oil. When knowing the measured soap number and target soap number of the crude tall oil, the amount of needed sulphuric acid for the acidulation of the saponified acids in the crude tall oil can be calculated using mathematical formulas well known in the field, the sulphuric acid amount can be adjusted and added in real time, on-line to the crude tall oil.

The on-line measuring device and sulphuric acid dosing device connected to a controlling unit make it possible to provide accurate real-time dosing of sulphuric acid. The on-line dosing of sulphuric acid can be carried out with dosing devices known as such in the art, suitably pumps, injection devices etc.

Sulphuric acid having concentration in the range of 20-50 wt %, suitably 25-35 wt % is used in the method. This range provides suitable amount of water for optimal separation, and the heat formation associated with sulphuric acid addition is optimal for the method.

Sulphuric acid is dosed to the crude tall oil, to the suction side of the unloading pump, or alternatively after the unloading pump but prior to a pipeline mixer, provided that the length of the line between the vessel and dosing site of sulphuric acid (site of blending) is at least 20 m. In the case sulphuric acid is dosed after the unloading pump a pipeline mixer is arranged after (downstream) the dosing site of sulphuric acid.

Suitable pipeline mixers are for example static pipeline mixers, homogenizers etc. Preferably, in any alternative at least one pipeline mixer is arranged after the unloading pump.

Sulphuric acid is efficiently mixed in the pipeline with the crude tall oil whereby a mixture is formed, and the saponified acids of the tall oil soap are converted to free acids, increasing the crude tall oil content. Simultaneously water captured in the soap is released.

After the supplying or transferring of the mixture of crude tall oil and sulphuric acid to the vessel(s) such as storage tanks, is completed, the mixture is allowed to settle for 1 to 10 days, suitably for 2 to 6 days. The temperature in the vessel(s) is maintained at 30-85° C., suitably at 40-70, more suitably 50-60° C.

An aqueous phase is separated in the vessel from the treated crude tall oil. The aqueous phase and a treated crude tall oil may be separately removed from the vessel, for example by draining or decanting and the treated crude tall oil is recovered.

Metal impurities, such as metal salts, and impurities comprising P, Na, K and Ca concentrate in the aqueous phase and solid salts and solid metal impurities may be at least partly precipitated at the bottom of the vessel. The treated crude tall oil can be removed, suitably decanted from the vessel with means known as such, and the aqueous phase may be drained and the solid impurities removed from the bottom of the vessel.

The method for reducing impurities provides several advantages.

CTO may contain up to 10.000 ppm of metals, particularly when the tall oil soap content in CTO is high, such as 7 wt %. Increased soap number indicates elevated impurity contents, particularly elevated metal contents in crude tall oil.

When a CTO load or batch having high tall oil soap and high metal content is transferred to a storage vessel, the CTO stored earlier therein becomes contaminated. It takes long periods of time before the impurity levels in the CTO are again acceptable due to dilution effect. Draining and washing said vessels after contamination is often impossible because of practical and economic reasons. The low quality of CTO effects directly the further processing of the CTO, particularly in catalytic processing, where the catalysts are inactivated.

In the method the soap number can be reduced to values below 0.2, even below 0.1.

In an embodiment of the method the water content of the treated crude tall oil is less than 1.5 wt %.

The contents of metals, including alkaline and alkaline earth metals, such as Al, Ca, Cr, Cu, Fe, K, Mg, Mn, Na and Zn, as well as P can be reduced significantly.

The method provides a simple, adjustable, low cost and efficient means for reducing the amounts of metals, tall oil soap and water in the treated CTO, and simultaneously converts the saponified acids to free acids, which add up to tall oil content. No expensive investments are required, the needed amount of sulphuric acid can be dosed as required in real time, whereby no excess of sulphuric acid is used. The method enables the utilization of lower quality/varying quality crude tall oil because of this purification method.

The crude tall oil treated with this method can be used as such as feedstock in various chemical processes, and it may be subjected to catalytic hydroprocessing on at least one catalyst capable of the hydroprocessing reactions to provide hydrocarbons suitable as liquid fuels. Because the content of metal impurities and water is highly reduced, catalyst life time is increased in catalytic processing. This simple and very cost effective method for reducing impurities in CTO provides treated CTO with low amounts of metal impurities, low and constant soap number and low amounts of water. This prolongs the catalyst life time in further catalytic processing of the treated CTO.

EXAMPLES

The following examples are illustrative embodiments of the present invention, as described above, and they are not meant to limit the invention in any way. The invention is illustrated also with reference to the figures.

Example 1

Reducing Residual Soap in Crude Tall Oil

Pilot plant test was carried out simulating the method. 1 tn of crude tall oil having temperature of 100° C. and having soap number of 3.5 was treated with 1.5 kg of sulphuric acid (30%), and the mixture was allowed to settle at 60° C. for 24 hours. In test 1 the mixture of crude tall oil and sulphuric acid was mixed for 10 min and in test 2 for 60 min. Mixing accelerates the reduction of the soap number. In table 1 below the contents of metal impurities in the starting material crude tall oil and the treated products obtained in test 1 and test 2 are presented.

TABLE 1

|  |  | Crude tall oil | Test 1 | Test 2 |
|---|---|---|---|---|
| Acid number | mg/KOH/g | 155.6 | 155.6 | 155.6 |
| Soap number |  | 3.5 | 0.1 | 0.1 |
| Aluminum | mg/kg | 1.1 | <1 | <1 |
| Calcium | mg/kg | 180 | 28.2 | 5.82 |
| Chromium | mg/kg | 0.14 | <0.1 | <0.1 |
| Copper | mg/kg | 0.1 | 0.1 | 0.08 |
| Iron | mg/kg | 4.5 | 3.6 | 2.1 |
| Potassium | mg/kg | 50 | 7.3 | <2 |
| Magnesium | mg/kg | 3.41 | 1.2 | 0.83 |
| Manganese | mg/kg | 8.1 | 1.2 | 0.21 |
| Sodium | mg/kg | 1117 | 87 | 22 |
| Zinc | mg/kg | 0.56 | 0.28 | <0.1 |
| Water | wt % | 1.2 | <1 | <1 |

The invention claimed is:

1. A method for reducing residual soap in crude tall oil, wherein the method comprises the steps, where
a material consisting of crude tall oil containing up to 10,000 ppm of metals is supplied to at least one vessel,
soap number of the crude tall oil is measured on-line,
an amount of sulphuric acid having concentration between 20-50 wt %, needed for adjusting the soap number to a value of not more than 2 is determined, and
the determined amount of sulphuric acid is added to the crude tall oil at a site of blending whereby treated crude tall oil having soap number not more than 2 is obtained.

2. The method according to claim 1, wherein the method further comprises the steps where
the measured soap number is transmitted as an input to a controlling unit, which controlling unit determines as an output the amount of sulphuric acid needed for adjusting the soap number to a value of not more than 2,
the output of the amount of sulphuric acid is transmitted to a sulphuric acid dosing device, and
the amount of sulphuric acid is added to the crude tall oil according to the output, at a site of blending of crude tall oil and sulphuric acid.

3. The method according to claim 1, wherein the crude tall oil is supplied via a line to at least one vessel.

4. The method according to claim 3, wherein the soap number is measured from the crude tall oil running in the line.

5. The method according to claim 3, wherein the crude tall oil is supplied using an unloading pump.

6. The method according to claim 5, wherein the line comprises a pipeline mixer downstream the unloading pump.

7. The method according to claim 6, wherein sulphuric acid is added to the crude tall oil to suction side of the unloading pump or to a line downstream the unloading pump but prior to the pipeline mixer.

8. The method according to claim 3, wherein the soap number of the crude tall oil running in the line is measured using an on-line measuring device.

9. The method according to claim 3, wherein the length of the line between the site of blending and the vessel is at least 20 m.

10. The method according to claim 3, wherein after the adding of sulphuric acid at the site of blending, a mixture is obtained, which is transferred via the line between the site of blending and the vessel to the vessel, and the mixture is allowed to settle whereby an aqueous phase and treated crude tall oil are formed.

11. The method according to claim 10, wherein the treated crude tall and the aqueous phase are separated and the treated crude tall oil having soap number of not more than 2 is recovered.

12. The method according to claim 1, wherein the adding of sulphuric acid is adjusted to provide soap number of the treated crude tall oil of not more than 1.

13. The method according to claim 1, wherein the adding of sulphuric acid is adjusted to provide soap number of the treated crude tall oil of not more than 0.5.

14. The method according to claim 1, wherein the adding of sulphuric acid is adjusted to provide soap number of the treated crude tall oil of not more than 0.2.

15. The method according to claim 1, wherein the on-line measuring of the soap number is carried out by a FT-NIR method.

16. The method according to claim 1, wherein the temperature of the crude tall oil, which is supplied, is maintained at 30-100° C.

17. The method according to claim 1, wherein the temperature of the crude tall oil, which is supplied, is maintained at 30-85° C.

18. The method according to claim 1, wherein the temperature of the crude tall oil, which is supplied, is maintained at 50-80° C.

19. The method according to claim 1, wherein temperature in the vessel is maintained at 30-85° C.

20. The method according to claim 1, wherein the temperature in the vessel is maintained at 40-70° C.

21. The method according to claim 1, wherein the temperature in the vessel is maintained at 50-60° C.

22. The method according to claim 1, wherein crude tall oil supplied from a pulping plant, tanker truck or tanker ship.

* * * * *